(12) United States Patent
Jee

(10) Patent No.: US 8,174,232 B2
(45) Date of Patent: May 8, 2012

(54) SOLAR CHARGING APPARATUS AND METHOD FOR A MOBILE COMMUNICATION TERMINAL

(75) Inventor: Dong-Jo Jee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 343 days.

(21) Appl. No.: 12/260,845

(22) Filed: Oct. 29, 2008

(65) Prior Publication Data

US 2009/0128086 A1 May 21, 2009

(30) Foreign Application Priority Data

Oct. 29, 2007 (KR) ........................ 10-2007-0109187

(51) Int. Cl.
*H02J 7/00* (2006.01)

(52) U.S. Cl. ....................................... 320/108; 320/101

(58) Field of Classification Search .................. 320/101, 320/108
See application file for complete search history.

(56) References Cited

U.S. PATENT DOCUMENTS

| | | | | |
|---|---|---|---|---|
| 4,963,811 A * | 10/1990 | Weber | ........................... | 320/101 |
| 6,489,745 B1 * | 12/2002 | Koreis | ........................... | 320/108 |
| 7,471,062 B2 * | 12/2008 | Bruning | ........................... | 320/108 |
| 7,633,263 B2 * | 12/2009 | Toya | ........................... | 320/108 |
| 7,772,802 B2 * | 8/2010 | Manico et al. | ................ | 320/108 |
| 2007/0182367 A1 * | 8/2007 | Partovi | ........................... | 320/108 |
| 2008/0061733 A1 * | 3/2008 | Toya | ........................... | 320/103 |
| 2008/0094025 A1 * | 4/2008 | Rosenblatt et al. | ........... | 320/101 |

* cited by examiner

Primary Examiner — Ramy Ramadan
(74) Attorney, Agent, or Firm — Lee, Hong, Degerman, Kang & Waimey

(57) ABSTRACT

A contactless charging apparatus, comprising: a battery having an induction coil; and a charging unit for supplying a current generated by condensing solar light to a built-in magnetic field generating coil for charging the battery by inductive coupling between the magnetic field generating coil and the induction coil.

10 Claims, 7 Drawing Sheets

SOLAR CHARGING APPARATUS AND METHOD FOR A MOBILE COMMUNICATION TERMINAL

CROSS REFERENCE TO RELATED APPLICATIONS

Pursuant to 35 CFR 119, this application claims priority to Korean Application No. 10-2007-0109187, filed on Oct. 29, 2007, the content of which is hereby expressly incorporated by reference herein in its entirety.

TECHNICAL FIELD

The present disclosure relates to an apparatus and method for charging of a mobile terminal, using solar energy.

BACKGROUND

Mobile terminals may be configured to perform various functions such as data and voice communications, capturing images or video using a camera, recording audio, reproducing music files via a speaker system, displaying images or video and the like.

Some mobile terminals may include an additional function of playing games, and other mobile terminals may be implemented as multimedia players. In addition, mobile terminals may be configured to receive broadcast or multicast signals to allow viewing of content such as video or television programs.

As the functionality of mobile terminals increases, so does the demand for higher capacity batteries that support the terminals energy consumption requirements. Most terminals use rechargeable batteries. A contactless charging scheme has been developed that operates by inductive coupling between a first coil and a second coil, in which the first coil is provided at the charging apparatus and the second coil is provided at an object to be charged, such as a mobile terminal or other device.

The contactless charging method does not require connecting the battery or the charging apparatus to a charging unit directly. However, the charging unit itself must be connected to a supply voltage (e.g., AC 220V power source) through an AC/DC adapter and thus can be used only in places where the supply voltage is provided (e.g., home, offices, or the like).

If the supply voltage is not available (e.g., during travel, in rural areas, or the like) then the charging unit is unable to recharge the battery. A method and apparatus that can provide a user with a convenient means of contactless charging without using a supply voltage is needed.

SUMMARY

In accordance with one embodiment, a contactless charging apparatus is provided. The apparatus comprises a battery having an induction coil; and a charging unit for supplying a current generated by condensing solar light to a built-in magnetic field generating coil and thereby charging the battery by inductive coupling between the magnetic field generating coil and the induction coil.

In one embodiment, a contactless charging apparatus comprises a sub-storage unit for storing solar energy; a charging unit having a magnetic field generating coil so as to condense solar light and generate a current; a battery for charging by the magnetic field generating coil when the generated current is conducted to the magnetic field generating coil; and a controller for selectively conducting the generated current to the magnetic field generating coil or the sub-storage unit.

In one embodiment, the charging unit includes a solar module for condensing solar light and generating a current; and a magnetic field generating coil wound onto the solar module in a prescribed shape. The magnetic field generating coil may have different shapes and sizes according to the type of the solar module. The controller is configured such that the current flows to the magnetic field generating coil if the battery has started charging or the battery does not reach to a fully charged state, and the current flows to the sub-storage unit if the battery is not in charging mode or the battery reaches to the fully charged state.

In one embodiment, a contactless charging method comprises condensing solar light to a built-in magnetic field generating coil to generate a current; supplying the current via a charging unit; and charging a battery by inductive coupling between the magnetic field generating coil and an induction coil. The battery may be connected to a mobile terminal, such that if the battery is in charging mode and the battery is not a fully charged state, the current flows through the magnetic field generating coil, and when the battery is not in charging mode or when the battery has reached the fully charged state, the current flows to the sub-storage unit.

The scope of applicability of the present disclosure will become apparent from the detailed description given hereinafter. However, it should be understood that the detailed description and specific examples, while indicating preferred embodiments of the disclosed apparatus and method, are given by illustration, since various changes and modifications within the spirit and scope of the disclosed apparatus and method will become apparent to those skilled in the art from this detailed description.

BRIEF DESCRIPTION OF THE DRAWINGS

The present disclosure will become more fully understood from the detailed description given below and the accompanying drawings, which are given by illustration and thus are not limitative of the present disclosure.

Reference will now be made in detail to the preferred embodiments of the present disclosure, examples of which

DETAILED DESCRIPTION OF EXAMPLE EMBODIMENTS

Figure 1:
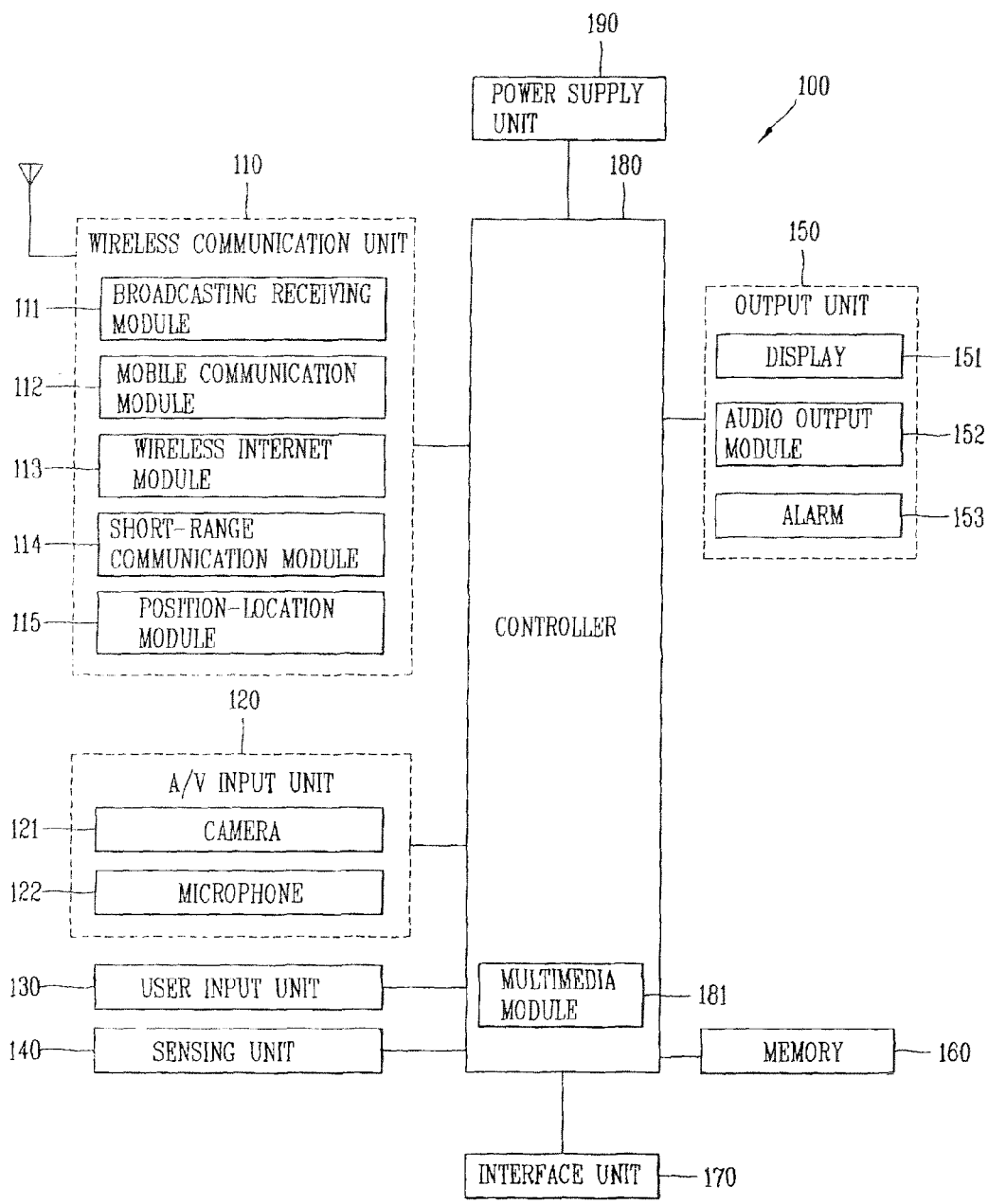
FIG. 1 is a schematic block diagram of a mobile terminal according to one embodiment.

Referring to FIG. 1, a mobile terminal may be implemented in various configurations or form factors. Examples of such terminals include mobile phones, smart phones, notebook computers, digital broadcast terminals, Personal Digital Assistants (PDA), Portable Multimedia Players (PMP), or navigators.

The mobile terminal 100 may include a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal having various components, but it is understood that implementing all of the illustrated components is not a requirement. Greater or fewer components may alternatively be implemented.

The wireless communication unit 110 may include one or more components which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless internet module 113, a short-range communication module 114 and a position location module 115.

The broadcast receiving module 111 receives a broadcast signal and/or broadcast associated information from an external broadcast managing server via a broadcast channel. The broadcast channel may include a satellite channel and a terrestrial channel. The broadcast managing server may indicate a server which generates and transmits a broadcast signal and/or broadcast associated information or a server which receives a pre-generated broadcast signal and/or broadcast associated information and sends them to the mobile terminal 100.

Examples of broadcast associated information may include information associated with a broadcast channel, a broadcast program, a broadcast service provider, and the like. The broadcast signal may be implemented as a TV broadcast signal, a radio broadcast signal, or a data broadcast signal, among others. The broadcast signal may further include a data broadcast signal combined with a TV or radio broadcast signal.

The broadcast associated information may be provided via a mobile communication network, and received by the mobile communication module 112. The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160. The mobile communication module 112 transmits/receives wireless signals to/from at least one of a base station, an external terminal and a server in a mobile communication network. Here, the wireless signals may include an audio call signal, a video call signal, or various formats of data according to transmission/reception of text/multimedia messages.

The wireless internet module 113 may support wireless Internet access for the mobile terminal 100. The wireless internet module 113 may be internally or externally coupled to the mobile terminal 100. The short-range communication module 114 refers to a module for short-range communications. Suitable technologies for implementing this module may include Bluetooth™, Radio Frequency IDentification (RFID), Infrared Data Association (IrDA), Ultra-WideBand (UWB) ZigBee™, and the functional or structural equivalents.

The position location module 115 refers to a module for identifying or calculating a position of a mobile terminal 100. The position location module 115 may be implemented using global positioning system (GPS) components which cooperate with associated satellites, network components, and combinations thereof. Here, the position information may include coordinates information represented by latitude and longitude. For example, the GPS module can measure accurate time and distance respectively from more than three satellites so as to accurately calculate a current position of the mobile terminal 100 based on such three different distances according to a triangulation scheme.

A scheme may be used to obtain time information and distance information from three satellites and correct error by one satellite. Specifically, the GPS module can further obtain three-dimensional speed information and an accurate time, as well as position on latitude, longitude and altitude, from the position information received from the satellites. In addition, the mobile terminal 100 may also include an Audio/video (A/V) input unit 120 that can provide audio or video signals to the mobile terminal 100. As shown, the A/V input unit 120 includes a camera 121 and a microphone 122. The camera 121 receives and processes image frames of still pictures or video obtained by image sensors in a video call mode or a capturing mode. The processed image frames may be displayed on a display 151.

The image frames processed by the camera 121 may be stored in the memory 160 or transmitted to the exterior via the wireless communication unit 110. Two or more cameras 121 may be provided according to the configuration of the mobile terminal 100. Further, the microphone module 22 may receive an external audio signal while the mobile terminal 100 is in a particular mode, such as a phone call mode, recording mode and voice recognition mode. The received audio signal is then processed and converted into digital data. Also, the mobile terminal 100, and in particular, the A/V input unit 120, may include assorted noise removing algorithms to remove noise generated in the course of receiving the external audio signal. In addition, data generated by the A/V input unit 120 may be stored in the memory 160, utilized by an output unit 150, or transmitted via one or more modules of the wireless communication unit 110. If desired, two or more microphones and/or cameras may be used.

The mobile terminal 100 may also include a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below. A sensing unit 140 may also be included in the mobile terminal 100 and may provides status measurements of various aspects of the mobile terminal 100.

For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and the like. As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, and the like.

The interface unit 170 may be implemented to couple the mobile terminal 100 to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like. An identification module (not shown) may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

The interface unit 170 may receive data from an external device, or be provided with power and accordingly transfer the received data or power to each component within the mobile terminal 100 or transfer data from the mobile terminal 100 to an external device. The output unit 150 may include various components which support the output requirements of the mobile terminal 100, such as a display 151, an audio output module 152, an alarm 153, and the like. The mobile terminal 100 may also include a display 151 that visually displays information associated with the mobile terminal 100. For instance, if the mobile terminal 100 is operating in a phone call mode, the display 151 may provide a user interface (UI) or graphical user interface (GUI) which includes information associated with placing, conducting and terminating a phone call.

As another example, if the mobile terminal 100 is in a video call mode or a photographing mode, the display 151 may additionally or alternatively display images which are associated with these modes. Further, the display 151 preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (IFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the mobile terminal 100 is in an opened position) and a second display configured as an external display (viewable in both the open and closed positions).

FIG. 1 further shows the output unit 150 having an audio output module 152 which supports the audio output requirements of the mobile terminal 100. The audio output module 152 may be implemented using one or more speakers, buzzers, other audio producing devices, or combinations thereof. Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

The alarm 153 may output a signal to inform of the occurrence of an event associated with the mobile terminal 100. Typical events may include call received, message received, user input received and the like. In addition to generating the audio or video signal, the alarm 153 may also output a signal to inform of the event occurrence in different ways by, for example, providing tactile sensations (e.g., vibration) to a user. The alarm 153 may also be configured to vibrate in response to the mobile terminal 100 receiving a call or message. As another example, vibration may be provided by the alarm 153 in response to receiving user input, thus providing a tactile feedback mechanism. Such vibration can also be provided to enable a user to recognize the occurrence of an event. The signal informing of the occurrence of an event may be outputted via the display 151 or the audio output module 152.

In addition, the memory 160 may be used to store various types of data to support the processing, control, and storage requirements of the mobile terminal 100. Examples of such data include program instructions for applications operating on the mobile terminal 100, call history, contact data, phonebook data, messages, pictures, video, etc. The memory 160 may be implemented using any type of suitable storage medium including a lash memory type, a hard disk type, a multimedia card micro type, a memory card type (e.g., SD or XD memory), Random Access Memory (RAM), Static Random Access Memory (SRAM), Read Memory (ROM), Electrically Erasable Programmable Read Memory (EEPROM), Programmable Read Memory (PROM), magnetic memory, magnetic disk, optical disk, and the like. Also, the mobile terminal 100 may operate using a web storage system, which performs the storage function of the memory 160 on the Internet.

The controller 180 typically controls the overall operations of the mobile terminal 100. For example, the controller 180 may perform the control and processing associated with voice calls, data communications, video calls, and the like. The controller 180 may include a multimedia module 181 which provides multimedia playback. The multimedia module 181 may be configured as part of the controller 180 or as a separate component. In addition, a power supply 190 provides power used by the various components for the portable device. The provided power may be internal power, external power, or combinations thereof.

Various embodiments described herein may be implemented in a computer-readable medium using, for example, software, hardware, or some combination thereof. For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments may be implemented by the controller 180.

In one embodiment, the embodiments such as procedures and functions may be implemented together with separate software modules each of which performs at least one of a variety of functions and operations. The software codes can be implemented with a software application written in any suitable programming language. Also, the software codes may be stored in the memory 160 and executed by the controller 180. As mentioned above, the internal components of the mobile terminal 100 related to the present disclosure have been described from the perspective of their functions.

Figure 2:
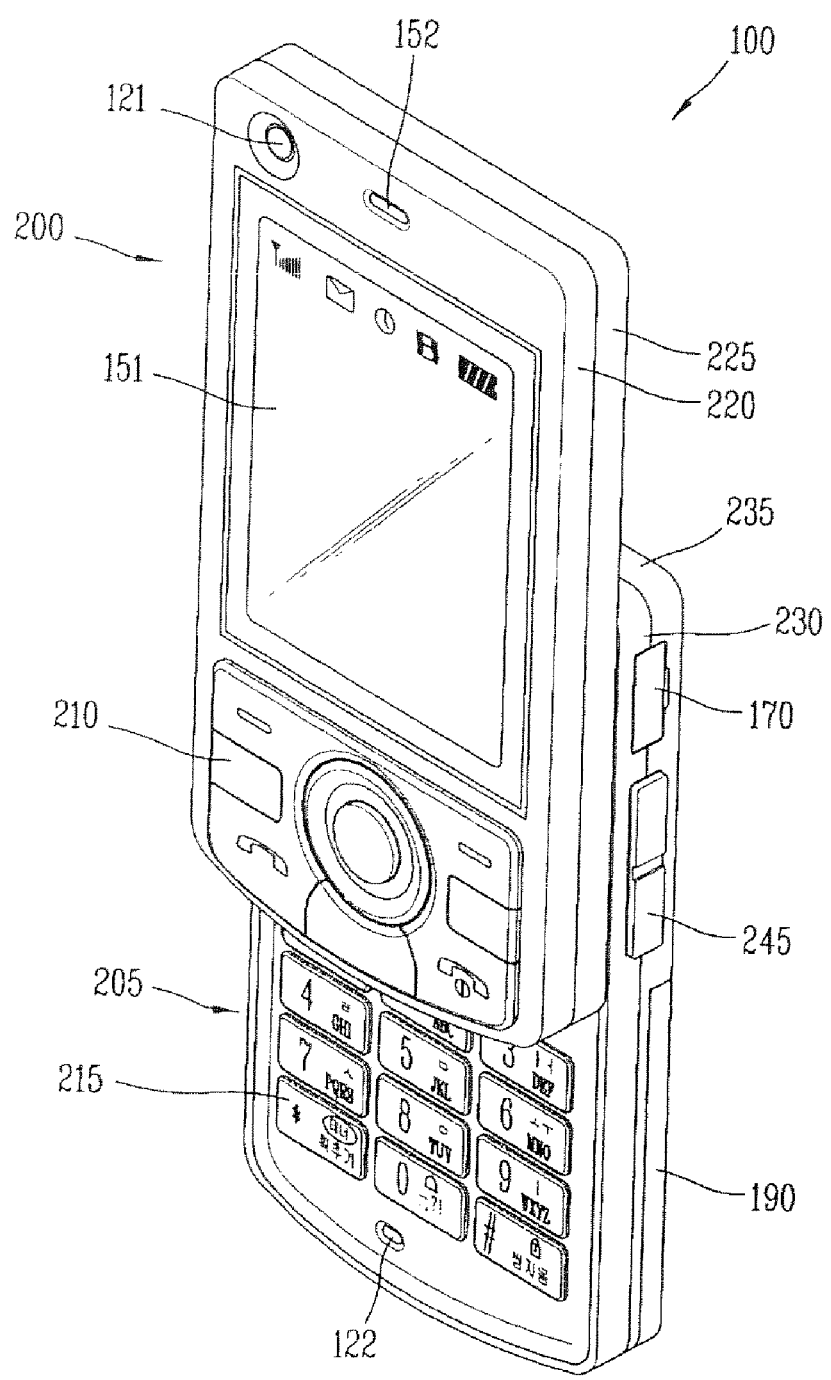
FIG. 2 is a front perspective view showing an exemplary mobile terminal according to one embodiment.
Figure 3:
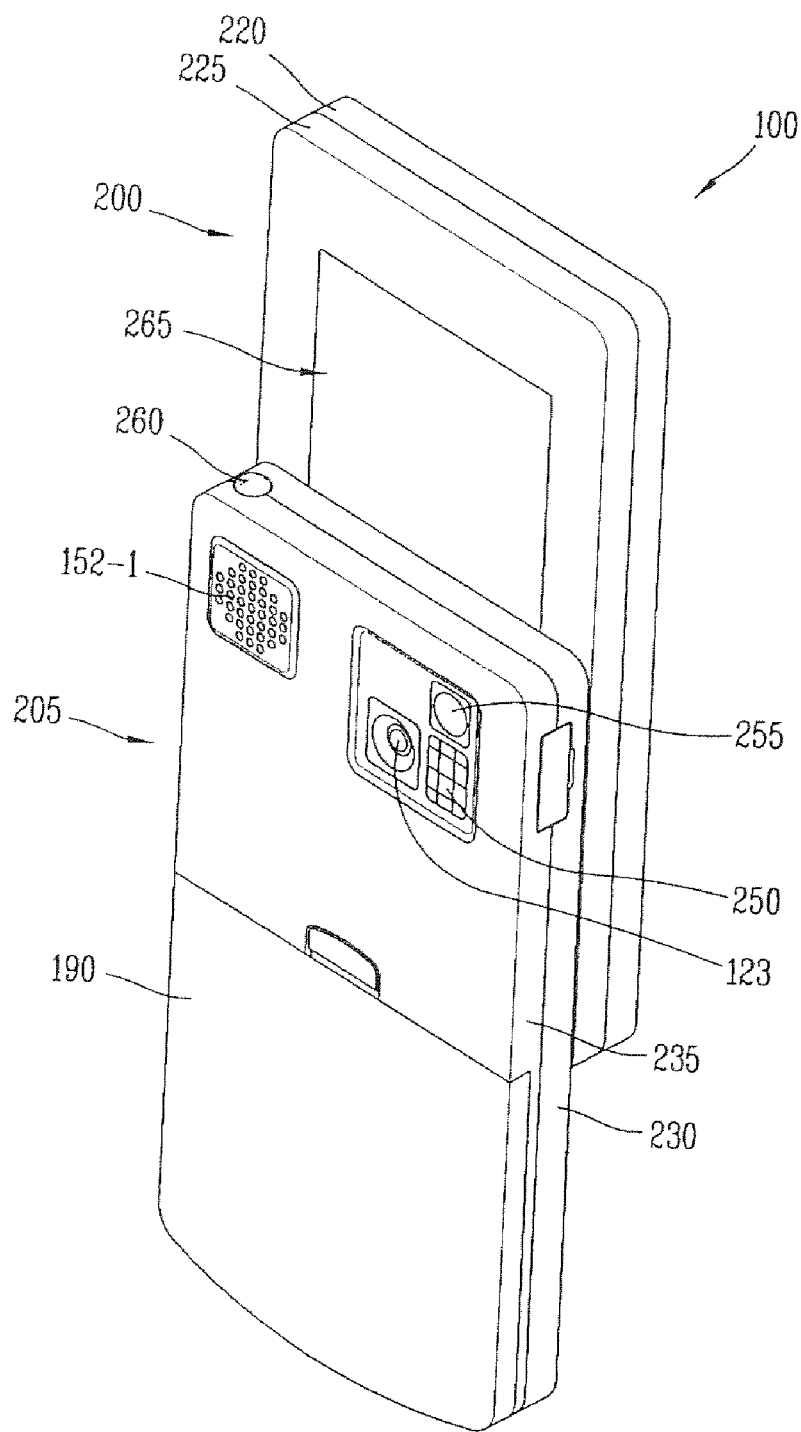
FIG. 3 is a rear perspective view of the mobile terminal in FIG. 2.

Referring to FIGS. 2 and 3, the mobile terminal 100 may be implemented in a variety of different configurations. Examples of such configurations include folder type, bar type, swing type, slide type or the like. For the sake of brief explanation, further disclosure will primarily relate to a slide-type mobile terminal. However, the present disclosure may not be limited to the slide-type mobile terminal 100, but can be applied to other types of terminals including the aforesaid types of terminals.

The mobile terminal 100 of the present disclosure may comprise a first body 200, and a second body 205 configured to slidably cooperate with the first body 200 in at least one direction. In case of a folder-type mobile phone, the mobile terminal 100 may include a first body, and a second body configured to be folded or unfolded cooperate with the first body in at least one side thereof.

The first body 200 is positioned over the second body 205 in a manner such that the second body 205 is obscured by the first body 200. This state can be referred to as a closed configuration (position). As illustrated in FIG. 2, the state where the first body 200 exposes at least part of the second body 205 can be referred to as an open configuration (position). The mobile terminal 100 may be operable in a standby (idle) mode when in the closed configuration, but this mode can be released by the user's manipulation. Also, the mobile terminal 100 may typically be operable in an active (phone call) mode in the open configuration. Here, this mode may be changed into the idle mode according to the user's manipulation or after a certain time elapses.

A case (housing, casing, cover, etc.) forming the outside of the first body 200 is formed by a first front case 220 and a first rear case 225. Various electronic components may be disposed in a space between the first front case 220 and the first rear case 225. One or more intermediate cases may additionally be disposed between the first front case 220 and the first rear case 225. The cases can be formed of resin in a manner of injection molding, or formed using metallic materials such as stainless steel (STS) and titanium (Ti).

A display 151, an audio output module 152, a camera 121 or a first user input unit 210 may be disposed at the first front case 220 of the first body 200. The display 151 may include LCD, OLED, and the like, which can visually display information. The display 151 and a touchpad can be layered with each other such that the display 151 can be configured to function as a touch screen so as to allow a user to input information in a touching manner. The audio output module 152 may be implemented as a speaker.

The camera 121 may be implemented to be suitable for a user to capture still images or video. Similar to the first body 200 a case configuring the outside of the second body 205 may be formed by a second front case 230 and a second rear case 235. The second user input unit 215 may be disposed at the second body 205, in detail, at a front face of the second front case 230. A third user input unit 245, a microphone 122 and an interface unit 170 may be disposed either at the second front case 230 or at the second rear case 235. The first to third user input units 210, 215 and 245 may be named as a user input unit 130. Any tactile manner that a user can touch, e.g., the display 151, for manipulation can be employed for the user input unit 130.

For example, the user input unit 130 can be implemented as a dome switch or touchpad which a user can input information in a pushing or touching manner, or implemented in a manner of using a wheel, a jog or a joystick to rotate keys. Regarding each function, the first user input unit 210 may be used for inputting commands such as START, END, SCROLL or the like, and the second user input unit 215 may be used for inputting numbers, characters, symbols, or the like. Also, the third user input unit 245 can be operated as a hot key for activating a specific function within the mobile terminal. The microphone 122 may be implemented to be suitable for receiving user's voice or various sounds.

The interface unit 170 may be used as a passage through which the mobile terminal 100 can exchange data or the like with an external device. For example, the interface unit 170 may be implemented as at least one of a wired/wireless connection port for connecting an earphone to the mobile terminal 100, a port for short-range communications (e.g., an Infrared Data Association (IrDA) port, a BLUETOOTH™ port, a wireless LAN port, etc.), power supply ports for providing power to the mobile terminal 100, or the like. The interface unit 170 can be a card socket for receiving an external card, such as a Subscriber Identity Module (SIM), a User Identity Module (UIM), a memory card for storing information, or the like.

The power supply 190 may be disposed at a side of the second rear case 235 to provide power to the mobile terminal 100. The power supply 190 may be a rechargeable battery, for example, to be attachable/detachable for charging. As illustrated in FIG. 3, a camera 121 may further be disposed at a rear face of the second rear case 235 of the second body 205. The camera 121 of the second body 205 faces a direction which is opposite to a direction faced by the camera 121 of the first body 200, and may have different pixels from those of the camera 121 of the first body 200.

For example, the camera 121 of the first body 200 may operate with relatively lower pixels (lower resolution). Thus, the camera 121 of the first body 200 may be useful when a user can capture his face and send it to another party during a video call or the like. On the other hand, the camera 121 of the second body 205 may operate with a relatively higher pixels (higher resolution) such that it can be useful for a user to obtain higher quality pictures for later use. A flash 250 and a mirror 255 may additionally be disposed adjacent to the camera 121 of the second body 205. The flash 250 operates in conjunction with the camera 121 of the second body 250 when taking a picture using the camera 121 of the second body 205. The mirror 255 can cooperate with the camera 121 of the second body 205 to allow a user to photograph himself in a self-portrait mode.

The second rear case 235 may further include an audio output module 152. The audio output module 152 of the second body 205 can cooperate with the audio output module 152 of the first body 200 to provide stereo output. Also, the audio output module 152 may be configured to operate as a speakerphone. A broadcast signal receiving antenna 260 may be disposed at one side of the second rear case 235, in addition to an antenna for communications. The antenna 260 can be configured to retract into the second body 205.

One part of a slide module 265 which allows the first body 200 to be slidably coupled to the second body 205 may be disposed at the first rear case 225 of the first body 200. The other part of the slide module 265 may be disposed at the second front case 230 of the second body 205, such that it may not be exposed to the exterior as illustrated in FIG. 3. As such, it has been described that the second camera 121, and the like are disposed at the second body 205; however, the present disclosure is not limited to such configuration.

For example, it is also possible that one or more of those components (e.g., 260, 121~250, 152, etc.), which have been described to be implemented on the second rear case 235, such as the camera 121, will be implemented on the first body 200, particularly, on the first rear case 225. In this configuration, the component(s) disposed on the first rear case 225 can be protected by the second body 205 in a closed position of the mobile terminal 100. In addition, without the camera 121 of the second body 205, the camera 121 of the first body 200 can be implemented to be rotatable so as to rotate up to a direction which the camera 121 of the second body 205 faces.

The mobile terminal 100 of FIGS. 1 to 3 may be configured to operate within a communication system which transmits data via frames or packets, including both wireless and wireline communication systems, and satellite-based communication systems. Such communication systems utilize different air interfaces and or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like. By way of non-limiting example only, further description will relate to a CDMA communication system, but such teachings apply equally to other system types including the CDMA wireless communication system.

Figure 4:
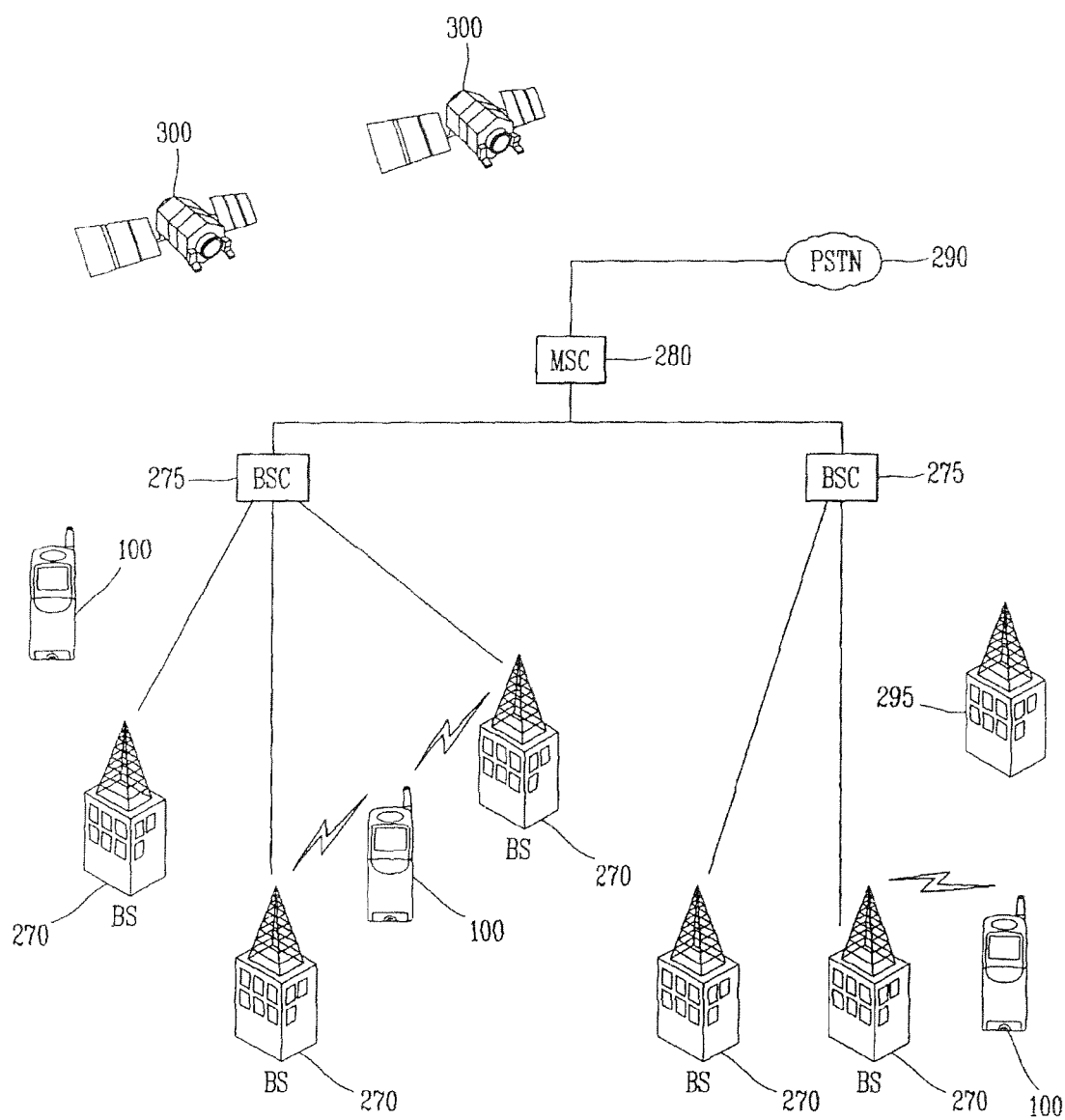
FIG. 4 is a block diagram of an exemplary wireless communication system operable with the mobile terminal according to one embodiment.

Referring to FIG. 4, a CDMA wireless communication system is shown having a plurality of mobile terminals 100, a pluralityy of base stations (BSs) 270, base station controllers (BSCs) 275, and a mobile switching center (MSC) 280. The MSC 280 is configured to interface with a conventional Public Switched Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 4.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.). The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 4, transmits a broadcast signal to the mobile terminals 100 operating within the system. The broadcast receiving module 111 (FIG. 1) is typically configured inside the mobile terminal 100 to receive broadcast signals transmitted by the BT 295. FIG. 4 further depicts several Global Positioning System (GPS) satellites 300. Such satellites 300 facilitate locating the position of at least one of a plurality of mobile terminals 100. Two satellites 300 are depicted in FIG. 4, but it is understood that useful position information may be obtained with greater or fewer satellites 300. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Figure 5:
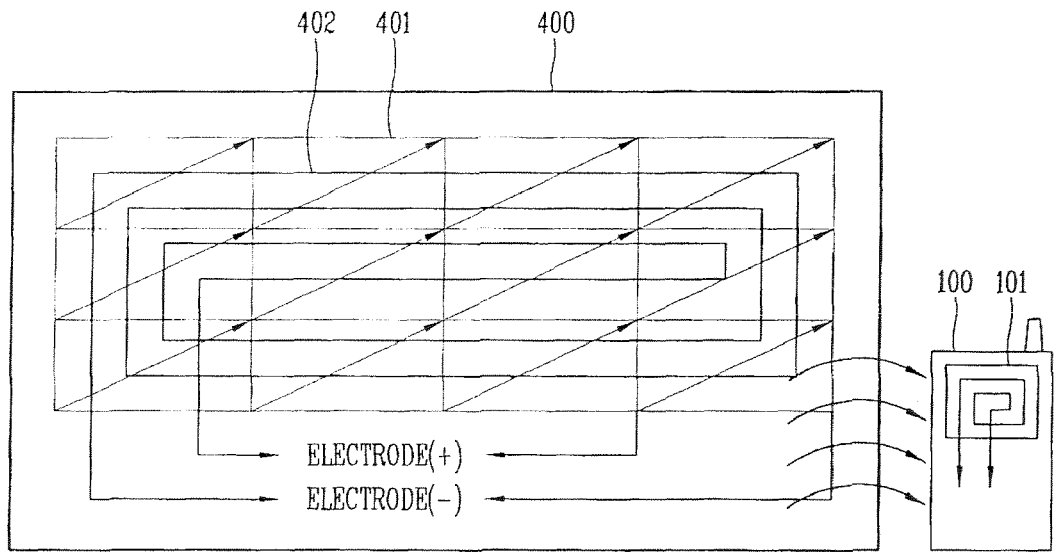
FIG. 5 is a block diagram of a contactless charging apparatus according to one embodiment.

Referring to FIG. 5, a contactless charging apparatus (e.g., a mobile terminal 100) may comprise a battery having an induction coil 101; and a charging unit 400 for supplying a current generated by condensing solar light to a magnetic field generating coil 402 and thereby charging the battery by inductive coupling between the magnetic field generating coil 402 and the induction coil 101.

The charging unit 400 includes a solar module 401 for condensing solar light and generating a current; and the magnetic field generating coil 402 connected to the solar module 401. The charging unit 400 may be implemented in a pad shape. The mobile terminal 100 may include or be coupled to a rechargeable battery. In one embodiment, the battery may include a second coil. In addition, the magnetic field generating coil 402 is positioned at one side of an inside the main body of the mobile terminal 100 or a battery, and its shape and size may differ according to the type of the solar module 401.

Figure 6:
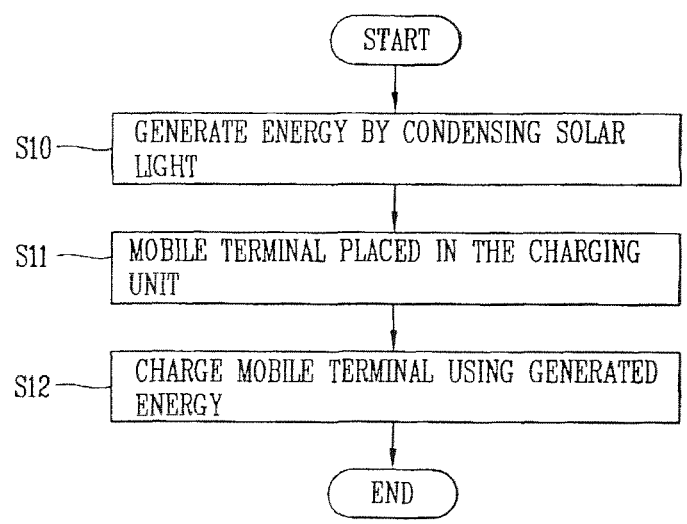
FIG. 6 is a flowchart showing a contactless charging method using solar energy according to one embodiment.

The solar module 401 is directly connected to the magnetic field generating coil 402 so as to conduct the current generated by condensing solar light. With such configurations, description of the contactless charging apparatus according to one embodiment will be given in detail with reference to the accompanying drawing. As shown in FIG. 6, for example, when the charging unit 400 is exposed to solar light, the solar module 401 condenses the solar light and generates energy, i.e., a current (S10), and then the generated current lows through the magnetic field generating coil 402.

Accordingly, if the mobile terminal 100 having the induction coil 101 contacts or is placed onto the charging unit 400 (S11), a magnetic field is generated by inductive coupling of the magnetic field generating coil 402 and the induction coil 101 and an induced current is then generated at the induction coil 101 by the generated magnetic field. Accordingly, the generated induced current is stored in the battery, thereby charging the battery connected to mobile terminal 100 by way of the energy generated from the solar module 401 (S12). Advantageously, the contactless charging generates a current by using the solar module, and then performs a charging operation using the current, thereby charging the mobile terminal 100 at anytime and in any place without requiring to have the supply voltage (AC 220V).

Figure 7:
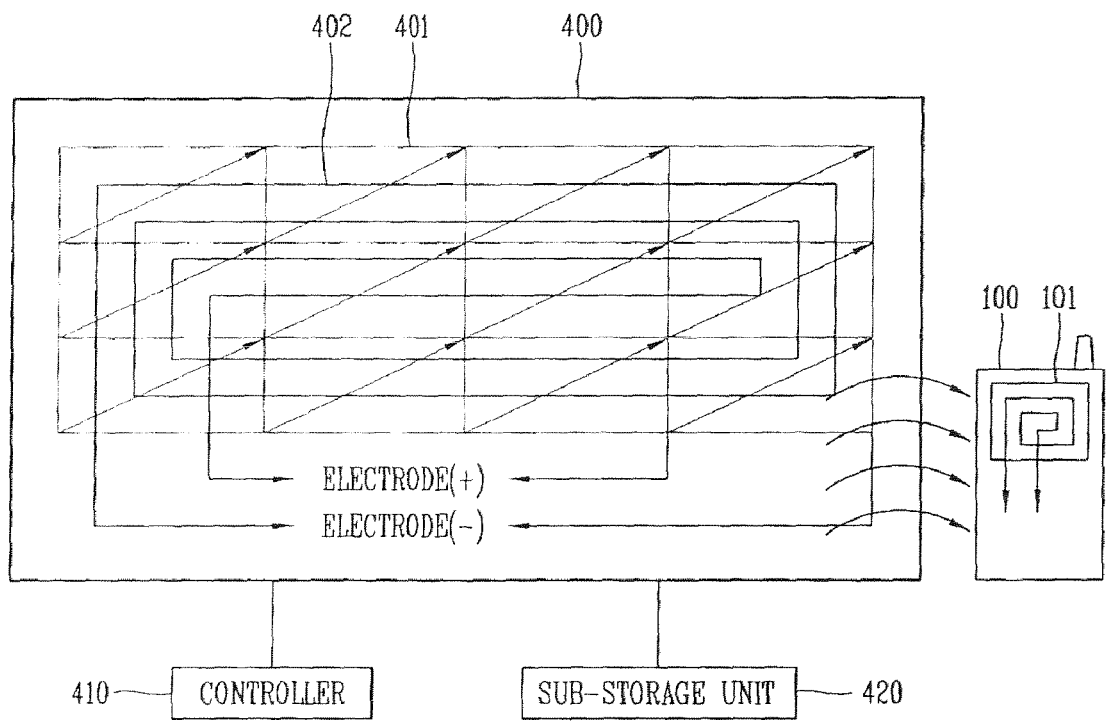
FIG. 7 is a block diagram of a contactless charging apparatus according to one embodiment.

Referring to FIG. 7, the contactless charging apparatus may further comprise a controller 410 and a sub-storage unit 420. That is, the contactless charging apparatus as shown in FIG. 7 determines when it charges or does not charge, and according to the determination, either performs charging or stores the solar energy. Preferably, the sub-storage unit 420 may also be implemented as a capacitor. In one embodiment, the solar module 401 is configured to condense solar light and generate a current when external light (e.g., sun light) is available. Accordingly, it would be more effective if the energy generated by using the solar module 401 in the daytime is stored in an additional storage unit, so that the stored energy can be used at night or when external light is not available.

Figure 8:
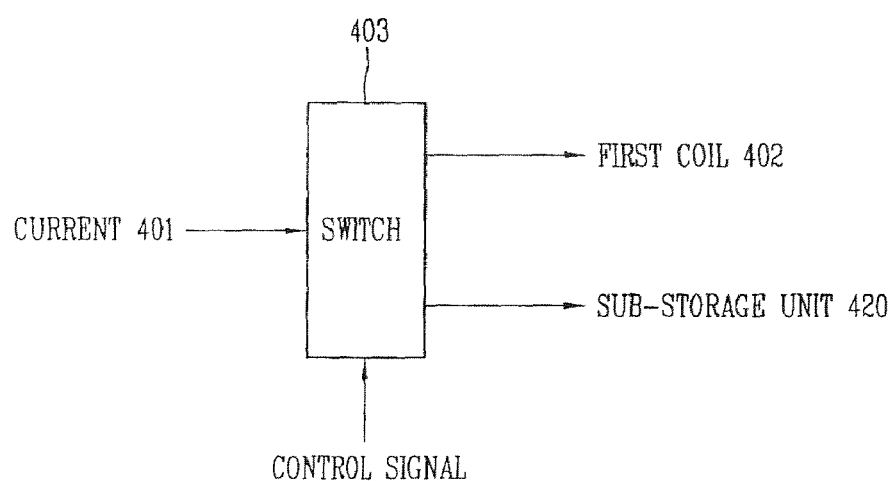
FIG. 8 is an overview showing a switch structure for conducting a current generated by condensing solar light in the contactless charging apparatus according to one embodiment.

The solar module 401, as shown in FIG. 8, is connected to the magnetic field generating coil 402 or the sub-storage unit 420 through a switch 403 so as to conduct the current generated by condensation of solar light. Accordingly, the controller 410 performs a control of the switch 403 by detecting whether or not it is in charging mode whereby the energy generated by the solar module 401 may be used to charge the mobile terminal 100 or the energy may be stored in the sub-storage unit 420. The controller 410 may recognize whether or not the charging operation is performed, in case when the mobile terminal 100 contacts the solar module 401 (for charging) or when the magnetic field generating during the charging operation is detected.

Figure 9:
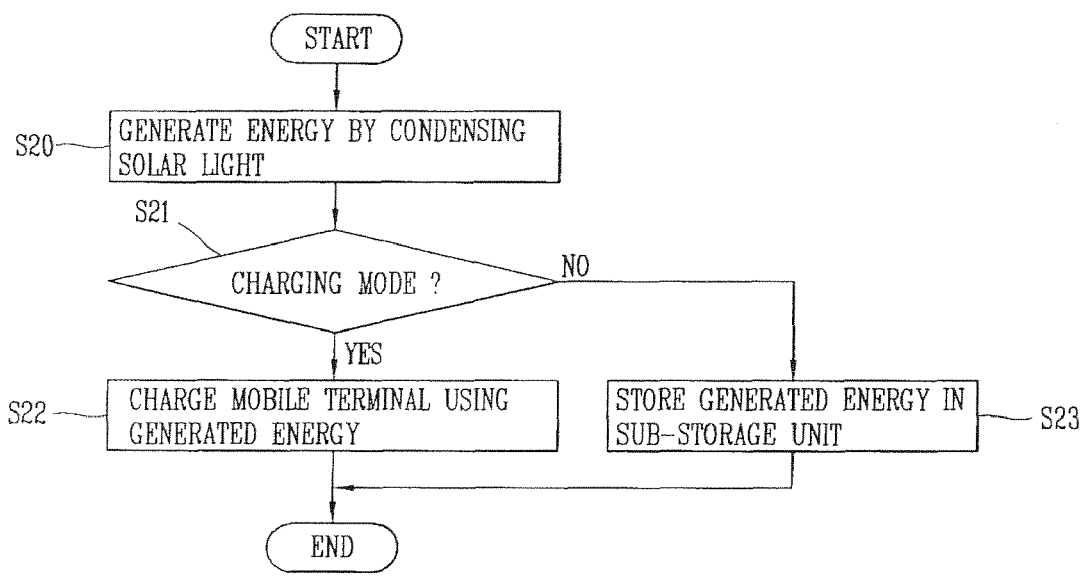
FIG. 9 is a flowchart showing an exemplary contactless charging method using solar energy according to one embodiment.

Referring to FIG. 9, if the charging unit 400 is exposed to solar light, the solar module 401 condenses the solar light and generates energy, i.e., a current (S20). The controller 410 performs a control of a conducting path of the current by checking whether a charging mode is activated (S21). If yes, the controller 410 outputs a control signal to the switch 403 such that the current generated from the solar module 401 flows through the magnetic field generating coil 402 to charge the mobile terminal 100 battery using the generated energy from the solar light (S22).

In other words, the magnetic field is generated by the inductive coupling of the magnetic field generating coil 402 and the second coil 101. As a result of the generated magnetic field, the induced current is generated at the second coil 101 side, thus charging the mobile terminal 100 battery by energy generated from the solar module 401. On the other hand, if the charging mode is inactive, the controller 410 outputs a control signal to the switch 403 so that the current generated from the solar module 401 flows toward the sub-storage unit 420 side. Accordingly, the energy generated from the solar module 401 is stored in the sub-storage unit 420 (S23).

Figure 10:
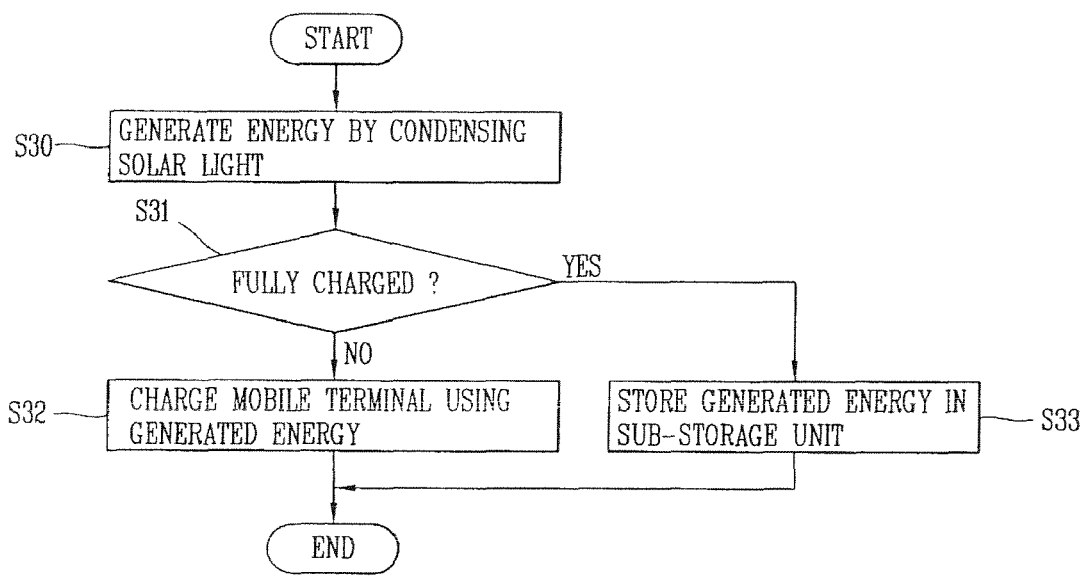
FIG. 10 is a flowchart showing another exemplary contactless charging method using solar energy according to one embodiment.

FIG. 10 shows an example method for controlling a conductive path of the current generated by the solar module 401 (S30), depending on whether the battery for the mobile terminal 100 has reached a fully charged status. That is, if the mobile terminal 100 battery is fully charged while the charging mode is active, and when the mobile terminal 100 remains in the charging unit 400, the current generated from the solar module 401 would continue to flow to the first coil 402. Therefore, the controller 410 in charging mode checks whether or not the mobile terminal 100 has reached a fully charged state (S31).

If the mobile terminal 100 has not reach to the fully charged state, the controller 410 performs a control of the switch 403 so that the current generated from the solar module 401 flows through the magnetic field generating coil 402 (S32). If the mobile terminal 100 has reached the fully charged state, the controller 410 performs a control of the switch 403 so that the current generated from the solar module 401 flows toward the sub-storage unit 420 (S33). Accordingly, if the mobile terminal 100 is fully charged, the energy generated from the solar module 401 is stored in the sub-storage unit 420.

In one embodiment, the controller 410 performs the control of the conductive path of the current. However, a user may directly control the conductive path by manipulating an input apparatus which is additionally provided on the charging unit. In this case, the controller 410 is replaced with the input apparatus. The contactless charging apparatus may perform the charging operation in any place where the sun shines without requiring to have the supply voltage, and store the extra energy in the sub-storage unit during the charging operation, thereby conveniently charging the mobile terminal 100 even in a place where there is no sunlight.

The contactless charging method according to one embodiment can be implemented as computer-readable codes in a medium recording a program. The computer-readable medium may include all types of recording apparatuses each storing data which is readable by a computer system. Examples of such computer-readable media may include ROM, RAM, CD-ROM, magnetic tape, floppy disk, optical data storage element and the like. Also, such computer-readable medium may be implemented in a type of a carrier wave (e.g., a transmission via an Internet). The computer can include the controller 180 of the mobile terminal 100.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present disclosure may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the scope of the claims, or equivalents of such scope as is therefore intended to be embraced by the appended claims.

What is claimed is:

1. A contactless charging apparatus comprising:
a solar module configured to generate a current by condensing solar light;
a user input switch configured to direct an output of the generated current;
a charging unit configured to output the generated current according to the user input switch;
a magnetic field generating coil configured to charge an external battery via an inductive arrangement between the magnetic field generating coil and an induction coil connected to the external battery when the user input switch directs the output of the generated current to the magnetic field generating coil; and a sub-storage unit configured to store energy supplied via the generated current when the user input switch directs the output of the generated current to the sub-storage unit.

2. The contactless charging apparatus of claim 1, wherein the external battery is connected to a mobile terminal.

3. The contactless charging apparatus of claim 1, wherein the contactless charging apparatus is a pad shape.

4. The contactless charging apparatus of claim 1, wherein the magnetic field generating coil is wound onto the solar module in a first shape.

5. The contactless charging apparatus of claim 4, wherein a shape and a size of the magnetic field generating coil vary according to a type of the solar module.

6. A contactless charging apparatus comprising:
a charging unit configured to generate a current via solar light;
a user input switch configured to selectively conduct the generated current;
a sub-storage unit configured to store energy supplied via the generated current when the user input switch conducts the generated current to the sub-storage unit; and
a magnetic field coil configured to charge an external battery via induction when the user input switch conducts the generated current to the magnetic field coil.

7. The contactless charging apparatus of claim 6, wherein the charging unit comprises a solar module configured to condense the solar light and to generate the current, and
wherein the magnetic field generating coil is wound onto the solar module in a first shape.

8. The contactless charging apparatus of claim 6, wherein the sub-storage unit comprises a capacitor.

9. A contactless charging method, the method comprising:
condensing solar light via a solar module to generate a current;
directing the generated current according to a state of a user input switch;
supplying the generated current to a magnetic field generating coil for charging an external battery in contact with a charging unit by inductive coupling between the magnetic field generating coil and an induction coil attached to the external battery when the generated current is directed to the magnetic field generating coil according to a first state of the user input switch;
storing energy supplied via the generated current when the generated current is directed to a sub-storage unit according to a second state of the user input switch,
wherein the charging unit houses the magnetic field generating coil.

10. The contactless charging method of claim 9, wherein the external battery is connected to a mobile terminal which is distinct from the charging unit.

* * * * *